United States Patent
Aubrey

(10) Patent No.: US 8,202,346 B1
(45) Date of Patent: Jun. 19, 2012

(54) POROUS RETICULATED METAL FOAM FOR FILTERING MOLTEN MAGNESIUM

(75) Inventor: Leonard S. Aubrey, Hendersonville, NC (US)

(73) Assignee: Porvair, PLC, Norfolk (GB)

( * ) Notice: Subject to any disclaimer, the term of this patent is extended or adjusted under 35 U.S.C. 154(b) by 477 days.

(21) Appl. No.: 12/490,908

(22) Filed: Jun. 24, 2009

Related U.S. Application Data

(60) Provisional application No. 61/075,575, filed on Jun. 25, 2008.

(51) Int. Cl.
*C22B 9/02* (2006.01)

(52) U.S. Cl. ......... 75/490; 75/600; 210/496; 210/510.1; 210/767

(58) Field of Classification Search ............... 75/409, 75/600; 210/767, 496, 510.1
See application file for complete search history.

(56) References Cited

U.S. PATENT DOCUMENTS

| | | | |
|---|---|---|---|
| 4,056,586 A | 11/1977 | Pryor et al. | 264/44 |
| 4,385,931 A | 5/1983 | Wallevik et al. | 75/67 A |
| 4,457,496 A | 7/1984 | Du Manoir de Juaye et al. | 266/227 |
| 4,765,833 A * | 8/1988 | Narumiya et al. | 75/412 |
| 4,817,918 A | 4/1989 | Mochizuki et al. | 266/87 |
| 4,872,908 A | 10/1989 | Enright et al. | 75/68 R |
| 5,456,833 A | 10/1995 | Butcher et al. | 210/488 |
| 5,673,902 A | 10/1997 | Aubrey et al. | 266/229 |
| 5,908,488 A | 6/1999 | Schroder | 75/386 |
| 5,914,440 A | 6/1999 | Celik et al. | 75/407 |
| 6,289,969 B1 | 9/2001 | Outten et al. | 164/134 |
| 6,706,239 B2 | 3/2004 | Haack et al. | 419/2 |
| 6,773,825 B2 | 8/2004 | Pickrell et al. | 428/566 |

* cited by examiner

*Primary Examiner* — George Wyszomierski
*Assistant Examiner* — Tima M McGuthry Banks
(74) *Attorney, Agent, or Firm* — Joseph T. Guy; Nexsen Pruet, LLC

(57) ABSTRACT

A method for filtering molten magnesium or magnesium alloys is provided. The method includes the steps of: providing an organic foam; impregnating the organic foam with a slurry comprising metal particles; heating the impregnated organic foam to a temperature sufficient to volatilize the organic foam thereby forming a porous metal foam comprising no more than 0.5 wt % nickel; sintering the porous metal foam; passing molten magnesium or magnesium alloy through the porous metal foam thereby forming purified molten magnesium or magnesium alloy; and cooling the purified molten magnesium or magnesium alloy.

16 Claims, No Drawings

POROUS RETICULATED METAL FOAM FOR FILTERING MOLTEN MAGNESIUM

CROSS-REFERENCE TO RELATED APPLICATIONS

The present application claims priority to pending U.S. Provisional Patent Application 61/075,575 filed Jun. 25, 2008, which is incorporated herein by reference.

BACKGROUND OF THE INVENTION

The present invention provides an improved filter, and improved method, for purifying molten magnesium and magnesium alloys.

Magnesium and magnesium alloys are widely used and there are considerations for further use as a strong, lightweight, material in any application where these properties are advantageous. As would be realized, the use of magnesium requires purification to remove oxides, inter-metallic insoluble inclusions and other particles which could degrade the quality of a casting or ingot use for further downstream fabrication. Avoiding formation of such impurities has never been perfected, therefore the need for a removal method remains.

Filtration of molten metals through reticulated foam is widely practiced with each type of metal requiring filters constructed of specific materials. Molten aluminum and aluminum alloys are typically filtered by a reticulated foam filter comprising aluminum phosphate bonded alumina, sinter bonded high purity alumina or sinter bonded alumina-mullite. Molten copper and copper alloys are typically filtered through silica-bonded silicon carbide, aluminum phosphate bonded silicon carbide, sinter bonded alumina-mullite, sinter bonded magnesium oxide partially stabilized zirconia and yttria partially stabilized zirconia-alumina. Molten iron and many iron alloys are typically filtered with silica bonded silicon carbide, aluminum phosphate bonded silicon carbide, mullite or cordierite-mullite. Nickel-based superalloys are typically filtered with sinter bonded high purity alumina or sinter bonded partially stabilized zirconia. Steel, such as stainless steel, is typically filtered through partially stabilized zirconia.

Magnesium and magnesium alloys are typically filtered through reticulated foams of sinter bonded high purity alumina, sinter bonded magnesia, sinter bonded magnesium oxide partially stabilized zirconia or magnesium aluminate spinel. Molten magnesium and its alloys readily wet and chemically attack refractory oxide materials including high purity sinter bonded alumina, sinter bonded magnesia and sinter bonded magnesia partially stabilized zirconia. Other materials such as alumina, magnesia, magnesium aluminate spinel and zirconia are also readily wetted and chemically attacked by molten magnesium and its alloys making them unsuitable for use.

Due to the effective wetting and chemical attack on many materials the art has been lacking a suitable material for filtering molten magnesium or magnesium alloys. The present application provides a material, which is suitable for filtering molten magnesium and magnesium alloys.

SUMMARY OF THE INVENTION

It is an object of the present invention to provide a reticulated foam filter for filtering molten magnesium and magnesium alloys.

A particular feature of the present invention is that the filter has limited reactivity with molten magnesium thereby mitigating reactivity between the filter and the molten metal.

These and other advantages, as will be realized, are provided in a method for filtering molten magnesium or magnesium alloy comprising passing the molten magnesium or magnesium alloy through a metal foam wherein the metal foam comprises less than 0.5 wt % nickel.

Yet another advantage is provided in a method for filtering molten magnesium or magnesium alloys comprising:
providing an organic foam;
impregnating the organic foam with a slurry comprising metal particles; heating the impregnated organic foam to a temperature sufficient to volatilize the organic foam thereby forming a porous metal foam comprising no more than 0.5 wt % nickel;
sintering the porous metal foam;
passing molten magnesium or magnesium alloy through the porous metal foam thereby forming purified molten magnesium or magnesium alloy; and
cooling the purified molten magnesium or magnesium alloy.

DETAILED DESCRIPTION

Provided herein is a reticulated metal foam filter particularly suitable for filtering molten magnesium and a method for filtering molten magnesium. More specifically, the present invention is directed to a reticulated metal foam filter, which is substantially free of nickel.

The present invention is based on a surprising understanding that by limiting the nickel, a metal foam can be employed for filtering molten magnesium. Limiting the nickel content mitigates wetting thereby decreasing the opportunity for reaction.

Particularly preferred metal foams include iron foam, steel foam and chromium stainless steel foam. In each case the metal foam comprises less than 0.5 wt % nickel. More preferably the metal foam comprises less than 0.2 wt % nickel. An open-cell metal foam is a metal foam formed from metal particles being bound together through a thermal-treating process to just below the solidus temperature. More specifically, in the present invention, the forming of an open-cell metal foam preferably begins with a polymeric foam being coated with a powdered metal composition. The coated polymeric foam is then thermally-treated and the polymeric base of a polymeric foam, along with any binding agents, thickening agents, or liquids from the powdered metal composition, are volatilized leaving behind only the metal from the powdered metal composition. The metal particles are bound together to form the open-cell metal foam.

The preferred method for forming the filter is referred to as the foam replication technique. The foam replication technique is a common method used to manufacture reticulated ceramic foam for use as molten metal filtration devices. In forming the filters a foam, and most preferably a polyurethane foam, is coated with ceramic slurry, then dried and fired. During firing, the polyurethane foam within the ceramic coating vaporizes but the ceramic structure remains resulting in an exoskeleton-like ceramic foam having hollow voids where the polyurethane once resided. The structure is essentially a connection of struts with porosity residing around and within these struts. The process for forming a ceramic filter is provided in U.S. Pat. Nos. 4,056,586; 5,456,833 and 5,673,902 each of which are incorporated herein by reference.

Formation of metal foams is described in commonly assigned U.S. Pat. No. 6,706,239 which is incorporated herein by reference.

In preparation of a metal foam a powdered metal composition is formed comprising the powdered metal, binder and additives. The powdered metal composition may comprise additives and components other than powdered metals such as binders, liquids, and shrinkage aids. Examples of suitable binders include, but are not limited to, organic adhesives, starches, polyvinyl alcohol, acrylic binders, xantham gum, methylcellulose, and phenolic binders. Examples of suitable liquids include, but are not limited to, water and solvents. A shrinkage aid refers to any material that can be removed upon heat-treatment and that lowers the green density of the powdered metal component providing more room for shrinkage. Polymers may be shrinkage aids, for example.

The selection of the powdered metal composition itself depends not only upon the metal or metal alloy selected for both the powdered metal component and the metal foam but also upon the final configuration of the final article. A typical powdered metal composition may comprise approximately 0.1 weight % to 15 weight % binder, 0 to 40 weight % liquid and 0 to 5 weight % shrinkage aid with the balance of the composition being a metal powder, such that the percent by weight is 100% based upon the total weight of the composition.

It is preferable that a chromium foam comprise 6-22 wt % chromium.

In forming a metal foam a polymeric foam is coated with a powdered metal composition to form a coated polymeric foam. The coated polymeric foam is then heated to a temperature below the solidus point of the powdered metal to volatilize the polymer and any solvents or other volatile materials from the metal slurry.

A polymeric foam having from about 3 to about 130 pores per inch will typically be used. More preferably the polymeric foam has from 10-60 pores per inch.

The slurry employed depends on the desired material for the chosen application. One must have sufficient properties in the final product to withstand the particular application and must have sufficient structural and/or mechanical strength to stand up to the particular elevated temperature conditions. In addition, the slurry preferably has a relatively high degree of fluidity and most preferably is comprised of an aqueous suspension of the metal intended for use in the filter. Normally, the slurry contains water. Additives, such as binders and surfactants may be employed in the slurry. It would be apparent that materials comprising nickel are to be avoided. It would also be apparent that materials which leave a significant portion of char are to be avoided or the heating profile is to be adjusted to avoid char formation.

The flexible foam material is impregnated with the metal slurry so that the fiber-like webs are coated therewith and the voids are filled therewith. Normally, it is preferred to repeatedly immerse the foam in the slurry and compress the foam between immersions to insure complete impregnation of the foam.

The impregnated foam is preferably compressed to expel from 25 to 75% of the slurry while leaving the fiber-like web portion coated therewith. In a continuous operation, one may pass the impregnated foam through a preset roller to affect the desired expulsion of slurry from the foam and leave the desired amount impregnated therein. This may be done manually by simply squeezing the flexible foam material to the desired extent. At this stage, the foam is still flexible and may be formed into configurations suitable for the specific filtration task, i.e., into curved plates, hollow cylinders, etc. It is necessary to hold the formed foam in position by conventional means until the polymeric substrate is decomposed, or preferably until the metal is fused. The impregnated foam is then dried by either air drying or accelerated drying at a temperature of from 35° to 700° C. for from 2 minutes to 6 hours. After drying, the material is heated at an elevated temperature to bond the metal particles making up the fiber-like webs. It is preferred to heat the dried impregnated material in two stages, with the first stage being to heat to a temperature of from 350° to 700° C. and holding within this temperature range for from 2 minutes to 6 hours in order to burn off or volatilize the web of flexible foam. Clearly this step can be part of the drying cycle, if desired. The second stage is to heat to a temperature of from 900° to 1700° C. and hold within that temperature range for from 2 minutes to 10 hours in order to bond the metal. The resulting product is a metal foam having an open cell structure characterized by a plurality of interconnected voids surrounded by a web of the metal. The metal foam may have any desired configuration based on the configuration needed for the particular filtration process.

Foam porosity is typically reported as an inverse length based on the theoretical average number of pores per distance assuming common struts there between. Foam porosity is therefore reported as pores per inch (PPI) or pores per mm (PPM). For example, a foam reported as 3.93 PPM (100 PPI) would have an average diameter of 0.254 mm (0.01 inches). For the purposes of the present invention it is preferable that the foam have a porosity of 0.119 PPM (3 PPI) to 3.93 PPM (100 PPI). Foam porosity is also reported as percent theoretical density. Theoretical density is calculated based on the density of a solid material with the same composition without voids, which also corresponds to a crystallographic unit cell density as well known in the art. Percent theoretical density is the ratio of the actual density to the theoretical density. For example, for a material with a theoretical density of 8 grams/cc and an actual density of 7.2 grams/cc the percent theoretical density would be 80%. For the purposes of the present invention the reticulated metal foam has a preferred percent theoretical density of 80 to 98%.

It is preferable to add volatile organic materials into the slurry to further increase the porosity.

In an alternative embodiment a metal slurry comprising spherically shaped voids therein can be formed into the desired shape and fired as described in U.S. Pat. No. 6,773,825, which is incorporated herein by reference thereto.

In one embodiment, a mixture of metal particles and pliable organic spheres as the pore former is prepared into a liquid, or suspension, and the mixture is formed into a shaped article or a foam filter is impregnated with the metal slurry. It is preferable that the pore formers are uniformly dispersed throughout the slurry and ultimately throughout the filter. The shaped article is dried and fired so that the metal particles are fused. The organic spheres and other organic additives are volatilized. The spheres are preferably low density and more preferably hollow. The size of the voids may be preselected by selecting the appropriate polymer spheres. The porosity is also easily controlled by the number of polymer spheres added. It is most preferred that the polymer spheres are each in contact with at least two other spheres such that a network of voids is created in the eventual diffuser.

It is most preferably to utilize spheres with an average diameter of 20 to 150 microns and more preferably 20-80 microns. An 80 micro sphere is most preferred. Other organic pore formers may be included including flour, cellulose, starch and the like. For the present application hollow organic spheres are most preferred due to the low volume of organic to pore volume which can be achieved and the minimal level of organic residue remaining after firing. It is most preferred that the slurry comprise up to about 10 wt % pore formers based on an 80 micron hollow sphere.

The material is either formed to size or cut to size. The material can be cut to size as a green ceramic or as a sintered ceramic.

The present invention has been described with particular reference to the preferred embodiments, which are intended to be illustrative, but are not considered to be limiting. Other configurations, alterations and embodiments could be realized from the teachings herein without departing from the scope of the invention, which is set forth more clearly in the claims appended hereto.

The invention claimed is:

1. A method for filtering molten magnesium or magnesium alloy comprising passing said molten magnesium or magnesium alloy through a metal foam wherein said metal foam comprises less than 0.5 wt % nickel wherein said metal foam comprises a material selected from the group consisting of iron, steel and chromium stainless steel.

2. The method for filtering molten magnesium or magnesium alloy of claim 1 wherein said metal foam comprises less than 0.2 wt % nickel.

3. The method for filtering molten magnesium or magnesium alloy of claim a 1 wherein said metal foam is a steel comprising less than 22 wt % chromium.

4. The method for filtering molten magnesium or magnesium alloy of claim 1 wherein said metal foam has a porosity of at least 3 pores per inch to no more than 130 pores per inch.

5. The method for filtering molten magnesium or magnesium alloy of claim 1 wherein said metal foam has a porosity of at least 10 pores per inch to no more than 60 pores per inch.

6. The method for filtering molten magnesium or magnesium alloy of claim 1 wherein said metal foam has a theoretical density of 80 to 98%.

7. A method for filtering molten magnesium or magnesium alloys comprising:
   providing an organic foam;
   impregnating said organic foam with a slurry comprising metal particles;
   heating said impregnated organic foam to a temperature sufficient to volatilize said organic foam thereby forming a porous metal foam comprising no more than 0.5 wt % nickel;
   sintering said porous metal foam;
   passing molten magnesium or magnesium alloy through said porous metal foam thereby forming purified molten magnesium or magnesium alloy; and
   cooling said purified molten magnesium or magnesium alloy.

8. The method for filtering molten magnesium or magnesium alloy of claim 7 wherein said metal foam comprises less than 0.2 wt % nickel.

9. The method for filtering molten magnesium or magnesium alloy of claim 7 wherein said metal foam comprises a material selected from the group consisting of iron, steel and chromium stainless steel.

10. The method for filtering molten magnesium or magnesium alloy of claim 9 wherein said steel comprises less than 22% chromium.

11. The method for filtering molten magnesium or magnesium alloy of claim 7 wherein said metal foam has a porosity of at least 30 pores per inch to no more than 100 pores per inch.

12. The method for filtering molten magnesium or magnesium alloy of claim 7 wherein said metal foam has a theoretical density of 80 to 98%.

13. The method for filtering molten magnesium or magnesium alloy of claim 7 wherein said slurry further comprises pore formers.

14. The method for filtering molten magnesium or magnesium alloy of claim 13 wherein said pore formers comprise hollow spheres.

15. The method for filtering molten magnesium or magnesium alloy of claim 14 wherein said slurry comprises hollow spheres with an average diameter of 20-150 microns.

16. The method for filtering molten magnesium or magnesium alloy of claim 14 wherein said slurry comprises up to 10 wt % of said pore formers.

\* \* \* \* \*